United States Patent [19]

Seeger et al.

[11] 4,337,744
[45] Jul. 6, 1982

[54] IGNITION SYSTEM FOR INTERNAL COMBUSTION ENGINES

[75] Inventors: Karl Seeger, Markgröningen; Werner Jundt, Ludwigsburg; Manfred Mezger, Markgröningen; Uwe Kiencke, Ludwigsburg; Jurgen Wesemeyer, Nuremberg; Georg Haubner, Berg; Werner Meier, Rednitzhembach, all of Fed. Rep. of Germany

[73] Assignee: Robert Bosch GmbH, Stuttgart, Fed. Rep. of Germany

[21] Appl. No.: 221,788

[22] Filed: Dec. 31, 1980

[30] Foreign Application Priority Data

Jan. 9, 1980 [DE] Fed. Rep. of Germany ....... 3000562

[51] Int. Cl.$^3$ .............................................. F02P 5/04
[52] U.S. Cl. .................................... 123/416; 123/422; 123/423; 364/431.07
[58] Field of Search .............. 123/416, 417, 418, 422, 123/423; 364/431.04, 431.05, 431.07

[56] References Cited

U.S. PATENT DOCUMENTS

| | | | |
|---|---|---|---|
| 4,015,565 | 4/1977 | Aono et al. | 123/416 |
| 4,063,539 | 12/1977 | Gorille et al. | 123/416 |
| 4,099,495 | 7/1978 | Kiencke et al. | 123/416 |
| 4,133,323 | 1/1979 | Adler | 123/416 |
| 4,168,682 | 9/1979 | Gartner et al. | 123/416 |
| 4,174,688 | 11/1979 | Hönig et al. | 123/416 |
| 4,225,925 | 9/1980 | Hattori et al. | 123/416 X |

*Primary Examiner*—Tony M. Argenbright
*Attorney, Agent, or Firm*—Frishauf, Holtz, Goodman & Woodward

[57] ABSTRACT

Clock pulses are counted to provide a count indicative of speed in a counter that is reset with every revolution of a reference mark. The difference between successive counts is multiplied by a fractional factor, which is not necessarily the same for acceleration and deceleration, then added algebraically to the current count value. The acceleration-corrected speed value is then multiplied by a parameter-dependent digital value obtained from a summing circuit to which various engine condition parameters are supplied and the output of the last-mentioned multiplier is supplied to a comparator to which the current count of clock pulses beginning with the reference mark passage is compared. When the comparator finds the match, spark ignition takes place. Another counter counts the clock pulses following each reference mark for sequencing multiplexers that enable some components to serve in more than one operation, in effect controlling the flow of digital values around various loops in the circuit.

18 Claims, 6 Drawing Figures

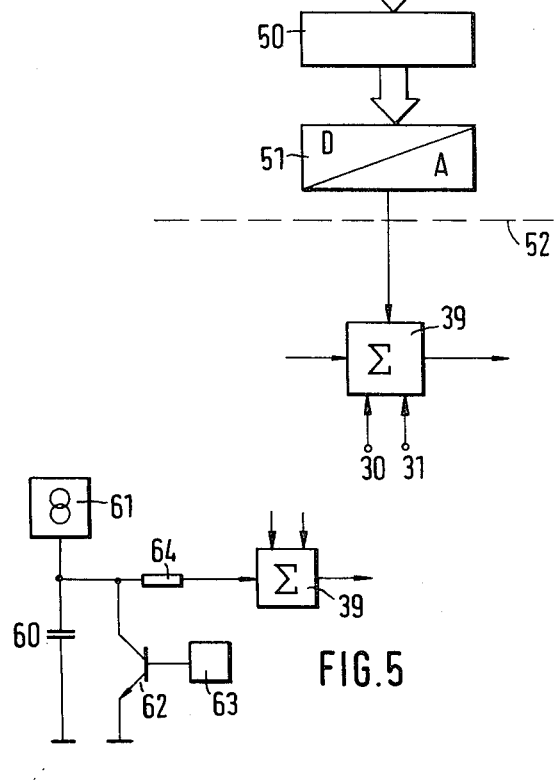
FIG.4
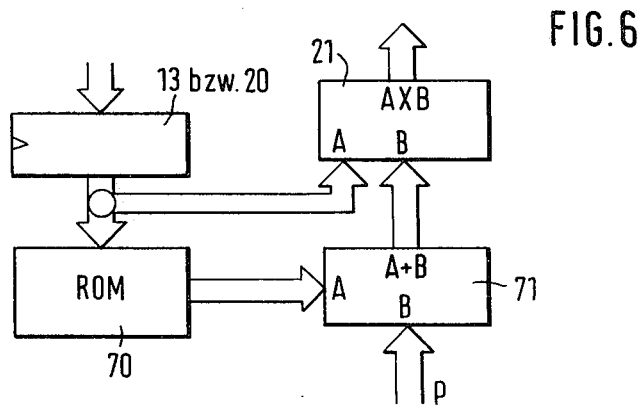
FIG.5
FIG.6

IGNITION SYSTEM FOR INTERNAL COMBUSTION ENGINES

This invention concerns an ignition system utilizing a counter for providing a digital value representing engine speed, which is used in combination with signals produced by other parameters to determine ignition timing.

Such ignition systems and ignition timing computers are known for example from German published patent application Nos. 2 504 843, 2 539 113, 2 640 791 and 2 655 948 corresponding respectively to U.S. Pat Nos. 4,063,539, 4,099,495, 4,133,323 and 4,174,688.

The above-mentioned known ignition systems are more or less expensively built in order to solve the general problem of bringing the influence of various parameters to bear on ignition timing. To a considerable extent quite expensive structures are necessary for this purpose, and it is very difficult to provide a modification of the system, for example by bringing in different or supplementary parameters. It is also difficult to take proper account of the dynamic state of engine operation (acceleration, deceleration).

The Invention

It is an object of the invention to provide an ignition timing system with very simple digital constitution of its basic structure for computing timing, which nevertheless makes it possible to bring to bear a multiplicity of parameters for shifting of ignition timing through external circuitry associated with the digital basic structure, the external circuitry being capable of execution by simple analog circuits. In particular, it is an object of the invention to include an acceleration correction in the ignition timing system and to make an overall control of ignition timing possible in a simple fashion.

Briefly, a speed-dependent count value is multiplied by a digital count value dependent upon various parameters, and the product thus obtained is counted out in clock pulses to determine ignition timing. Both the beginning of the dwell period and the spark timing at the end of dwell can be controlled by a comparator to which a count beginning at a reference mark passage is compared with a computed value derived as just mentioned. It is particularly advantageous to provide an acceleration correction to a speed dependent count value by comparing the speed-representative counts of successive cycles by subtraction and then multiplying the difference obtained by a constant, and adding the result to the speed-representative count of the most recent count period. In that manner, in acceleration and in braking, ignition timing can be more quickly corrected.

It is furthermore particularly useful to supply the speed-dependent count values to a ROM in order to generate any desired ignition timing shift characteristics, in which case the ROM output contents are connected with the multiplier stage. In the simplest case, these speed-dependent count values can be uncorrected (with respect to acceleration). If desired, some dynamic correction can be provided by including in the ROM address whether there is acceleration, deceleration or substantially neither and of course a more complete acceleration correction can be performed before the speed-dependent value is used as an ROM address.

Finally, it is particularly useful for ignition timing control to provide a storage device, a capacitor or a counter with a source for continuous modification of the storage content in one direction, while the storage content is discontinuously changed in the opposite direction by a switching circuit responsive to a regulating parameter, such as the engine knock boundary, the exhaust gas composition or the engine torque. If various analog parameter-dependent values are available, these are supplied through a summing amplifier working into an analog-digital converter to the multiplier stage for multiplying with the speed-dependent count value, the latter being preferably previously corrected for acceleration.

BRIEF DESCRIPTION OF THE DRAWINGS

The invention is further described by way of illustrative embodiments with reference to the annexed drawings, in which:

FIG. 4 is a circuit diagram, in block form, of a modification of the combination of FIGS. 1 and 3 for providing a speed-dependent signal value for applying to the circuit 39 of FIG. 3;

FIG. 5 is a circuit diagram of another modification of the circuit of FIG. 3, and FIG. 6 is a circuit diagram in block form of a modification of the circuit of FIG. 1 for the utilization of any desired ignition shift characteristic.

DESCRIPTION OF THE ILLUSTRATED EMBODIMENTS

Figure 1:
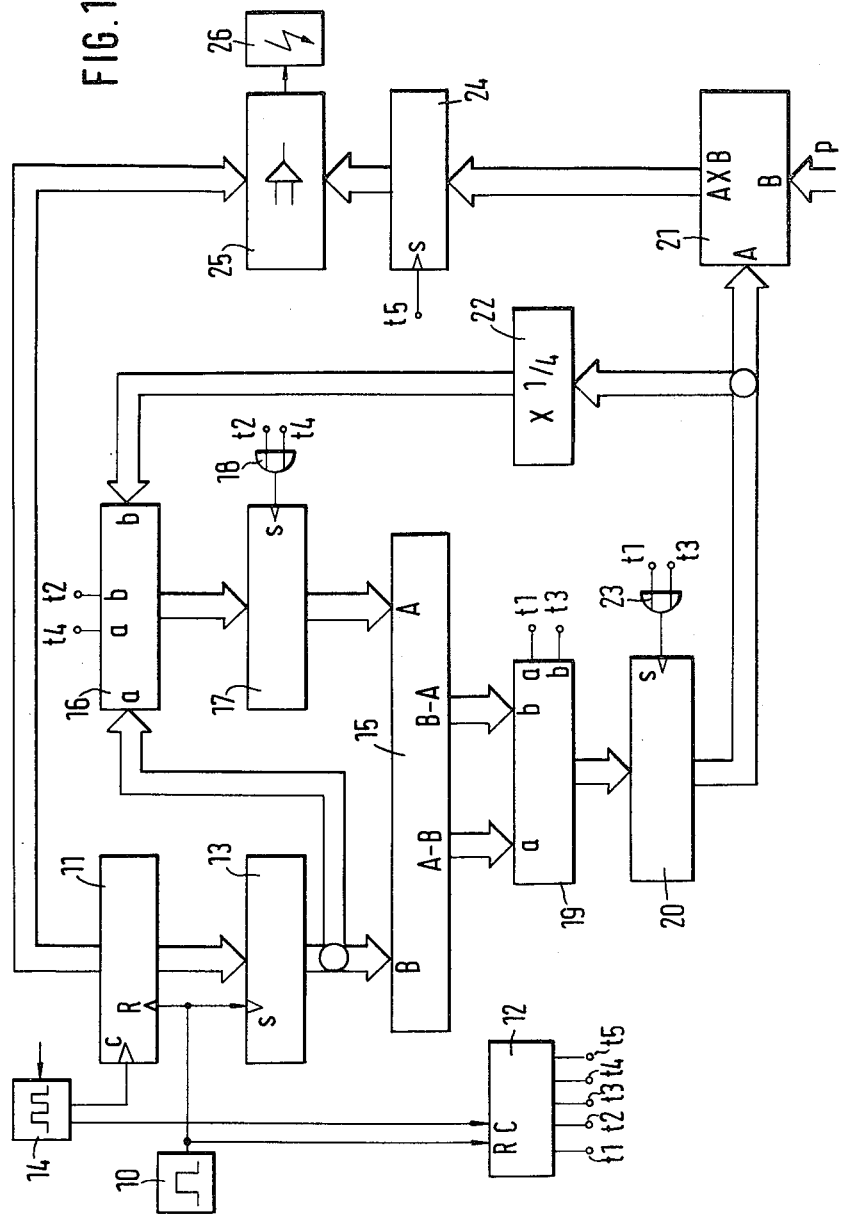
FIG. 1 is a circuit diagram, in block form, of an ignition timing system with acceleration correction in accordance with the present invention.

The embodiment of the invention illustrated in FIG. 1 includes a reference mark transducer 10 having its output connected to respective reset inputs of a counter 11 and of a sequence timing control circuit 12, and also with the enabling or setting input S of a buffer storage circuit 13 which of course can also be a counter. The reference mark transducer is of a kind illustrated in one or more of the prior art references mentioned above. This transducer may be of the kind providing a signal corresponding to a segment indicating the magnitude, as well as the timing, of an angle of rotation or it can provide merely a brief pulse. The sequence timing control circuit 12 provides separate output signals that respectively appear at different time-spaced intervals from the reference mark signal produced by the transducer 10. Such a sequence timing control circuit can be constituted by a counter that is reset by the reference mark signal and counts upward at a counting or clock frequency provided by the output of a clock frequency generator 14. Various count conditions in the counter corresponding to the desired timing interval are then decoded in the circuit 12, including the counter just mentioned, resulting for each decoding in a signal supplied at the corresponding output.

A further output of the clock frequency generator 14 is connected to the counting input C of the counter 11. The count (content) outputs of the counter 11 are connected with the count inputs of the buffer storage unit 13. The count outputs of the buffer storage circuit 13 are connected both with count inputs B of a subtraction stage 15 and with inputs a of a first multiplexer 16. The count outputs of the first multiplexer 16 are connected through a buffer storage unit 17 with the count input A of the subtraction stage 15. The subtraction stage 15 is normally constituted as an algebraic addition stage. The signals t2 and t4 are supplied through an OR-gate 18 to the set or load input of the buffer storage unit 17. The subtraction stage 15 has two complementary outputs A-B and B-A that are respectively connected to the inputs a and b of a second multiplexer 19. The reading-out at the output of the count information available either at input a or at input b is controlled by control inputs respectively related to these inputs, to which control inputs the signals t1 and t3 are respectively supplied. Count inputs of the multiplexer 19 are supplied through still another buffer storage unit 20 to the respective loading inputs of two multiplier stages 21 and 22. The signals t1 and t3 control the loading input of the buffer storage unit 20 through an OR-gate 23. In the multiplier 22, the count values provided at its input are multiplied by the factor $\frac{1}{4}$ and from its output the resulting value is supplied to the count inputs b of the multiplexer 16. The control of the multiplexer 16 is produced by the signal t4 and t2 over control inputs related to the corresponding loading inputs.

The initial count values of the buffer storage unit 20, which are applied to the input A of the multiplier stage 21, are multiplied in the multiplier 21 by parameter-dependent numerical values P that are made available at the input B. The product is supplied through a buffer storage unit 24 to a digital comparator 25, the other comparison number inputs of which are connected with the count outputs of the counter 11. The setting or loading input of the buffer storage unit 24 is controlled by the signal t5. Upon equality of the input count values, a control signal for an ignition pulse generating device 26 is produced at the output of the digital comparator 25. Such an ignition generating circuit can, for example, contain a dwell time control or regulator as, for example, made known in DE-OS 2 711 432, 2 711 894, 2 746,885 and 2 523 388.

This dwell time control or regulation usually contains also provisions for switching off quiescent state current. An idling stabilization circuit, as for example known from DE-OS 2 845 284 and 2 845 285, can likewise be provided. Another simple possibility for controlling the dwell time is the provision of an internal control duty cycle. For that purpose, a down-counter can be loaded at the ignition timing moment, which is to say with the output signal of the comparator 25, the down counter being then loaded with the content of the storage unit 20. When the down counter reaches the zero count content, the proportion of time corresponding to this fraction has lapsed. The control duty cycle thus produced can be utilized either for circuit closing time control or else merely for basic dwell angle which can then be corrected by a method in accordance with the above-mentioned known state of the art. The dwell time signal produced is utilized in a known way to control an ignition termination stage that consists essentially of a switching transistor connected in the primary current circuit of an ignition coil. Ignition sparks are produced in the circuit of the secondary winding of the ignition coil.

Figure 2:
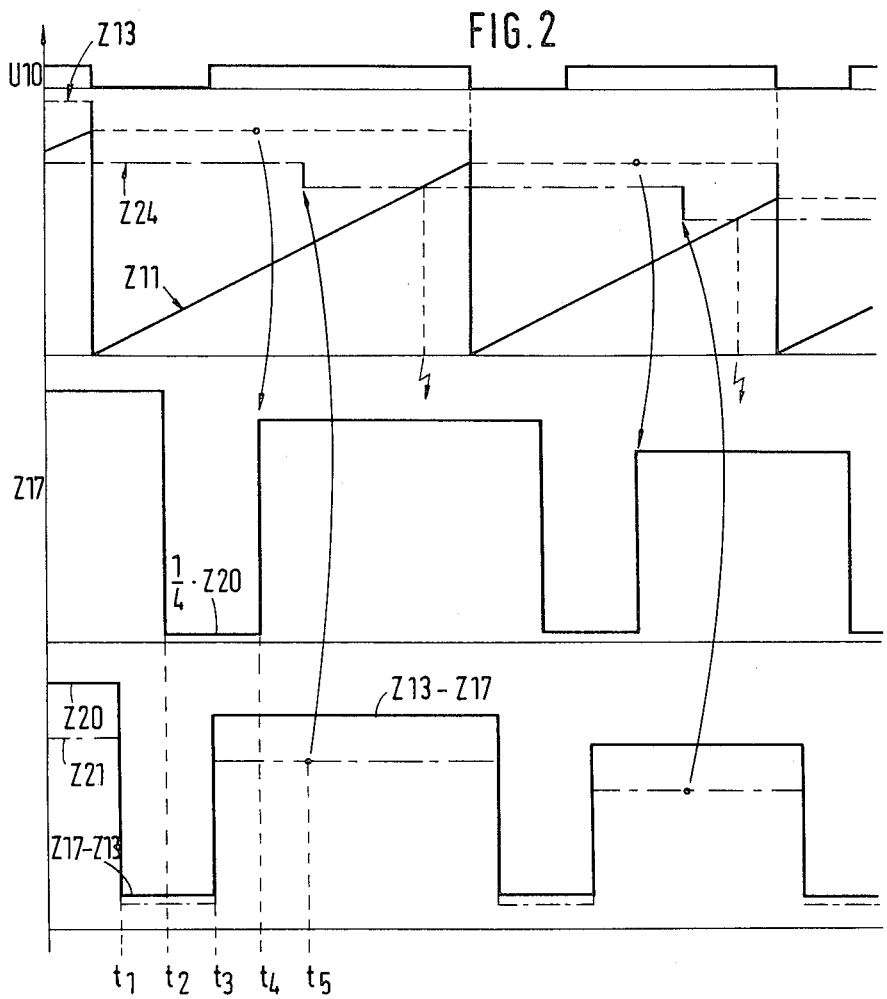
FIG. 2 is a timing diagram illustrating the manner of operation of the circuit of FIG. 1.

The manner of operation of the apparatus of FIG. 1 is best explained with reference to the signal wave diagrams shown on a common time scale in FIG. 2.

First a speed-dependent count value is obtained as the result of the clock frequency of the clock frequency generator being continuously counted upwards in the counter 11. On every trailing edge of the transducer signal U10 of the reference mark transducer 10, on the one hand the count condition Z13 reached at that moment is transferred into the buffer storage unit 13 and on the other hand, the counter 11 is reset to zero at the same time. In consequence, the buffer storage unit 13 always contains a speed-dependent count value. The principle of the invention now involves the application of the speed-dependent count value, in the multiplier stage 21, with a parameter-dependent count value P. The generation of such a parameter-dependent count value is explained further below in connection with subsequent figures of the drawings. The product generator multiplier 21 is transferred as the count condition Z24 into the buffer storage unit 24 at the moment t5. Ignition timing is then provided by counting up to this count condition Z24 (i.e. counting out count number) and that is performed by the counting of clock pulses by the counter 11 in supplying the output count value of this counter to the same comparator 25 to which the count condition Z24 is provided. The comparator produces an ignition timing output pulse upon finding equality of the two count values supplied to it. Thus, in a simple way a parameter-dependent shift of the ignition timing moment can be obtained.

The remaining components 15 to 20, 22 and 23 illustrated in FIG. 1, serve for the acceleration-dependent correction of the speed-dependent count value Z13. The principle here involved is that the speed-dependent count value of the preceding cycle is stored in the buffer storage unit 17 and the difference between succeeding speed-dependent values is formed in the subtraction stage 16 and is supplied to the buffer storage unit 19. This difference is a measure for the dynamics of the situation and the present concept proceeds from the view that such a dynamic should also continue into the next cycle in the same way. For this purpose, this difference is placed in the multiplier stage 22 for multiplying by the factor $\frac{1}{4}$ and then the result is subtracted from or added to the in accordance with the sense of the detected change between cycles. This speed-dependent count value is accordingly changed with the assumption that a detected dynamic condition will still continue in the forthcoming cycle.

At the moment t1 the buffer 20 is loaded with the difference between the speed-dependent count value of the previous period and the current speed-dependent count value (Z17-Z13). This is performed by switching the multiplexer 19 over to its input a at the moment t1.

At the moment t2 the buffer storage unit 17 is loaded with one-quarter of this difference Z17-Z13, which is to say with one-quarter of the count value Z20, this is performed by switching the multiplexer 16 at this moment to its input b where it receives the output of the multiplier stage 22, where the count value Z20 is multiplied by 0.25. The multiplexer 16 accordingly supplies the output of the multiplier 22 to the buffer storage unit 17 at the moment t2.

At the moment t3, the multiplexer 19 is switched to its input b, as the result of which the difference of the currently presented count values Z13-Z17 is loaded into the buffer storage unit 20. This count value accordingly corresponds to the speed-dependent count value Z13 less one-quarter of the difference between the speed-dependent count value of the previous period $Z_{n-1}$ and the speed-dependent count value of the current period $Z_n$:

$$Z_n - (Z_{n-1} - Z_n) \cdot \tfrac{1}{4}$$

At the moment t4, the multiplexer 16 is switched over and the buffer storage unit 17 is loaded with the output count value of the buffer storage unit 13. The value thus loaded into the buffer storage unit 17 for the next period serves as the speed-dependent count value of the period previous thereto. The output count value of the buffer storage 20 is continuously multiplied in the multiplier stage 21 by the parameter-dependent count value P and the product Z21 is loaded at the moment t5 into the buffer storage unit 24 and is there designated as the count value Z24. If now—as already described—this particular value of count is reached or overstepped by the state of the count in the counter 11, the comparator 25 produces a timing control signal for the ignition system 26.

It can be advantageously further provided that the frequency of the clock frequency generator 14 can be set or switched over in accordance with the number of engine cylinders in use. This is the significance of the arrow indicating an input to the clock frequency generator 14 in FIG. 1. In order to utilize fully the word length of the individual counters and buffer storage units independently of the number of cylinders and thereby also obtain corresponding degrees of precision, this switching over can be performed externally on the apparatus according to the invention, so that the same control apparatus can be used for engines of different numbers of cylinders and can even be switched in the type of engine in which sometimes only a part of the cylinder is in use. For example, the frequency of 40 kHz can be used for a four-cylinder engine, 60 kHz for the case of six cylinders and 80 kHz for eight cylinders. The switching-over signal for the clock frequency generator can be applied externally to the circuit unit preferably constituted as an IC and can cyclically be interrogated by a multiplex monitoring system, along with other information and parameter-dependent values relating to engine operation.

Preferably, the above-described method of providing an acceleration dependent correction of the ignition timing can also be applied to determination of the beginning of the dwell period, which should normally lie at a certain time-span before the ignition timing. For that purpose, two systems similar to FIG. 1 operating in parallel are needed. For the constitution of such a system in the form of a microcomputer, this provision of two acceleration correction systems does not involve any substantially greater expense. For example, in this case two threshold values could be supplied to the comparator 25, a switching-in threshold value at the start and a switching-out threshold value at the end of the dwell time.

Preferably, in the case of deceleration of the engine, the acceleration correction system for the beginning of the dwell time can be switched out in order to counteract the risk of insufficiently long dwells. This can take place, for example, by constituting the subtraction stage 15, so that upon a negative output value (deceleration) an overflow signal thus produced is evaluated in such a way that the subtraction stage is reset and thus cannot provide a correction difference. In principle, a corresponding modification is also possible for ignition timing. Another possibility of advantageous modification consists in providing a different fractional evaluation factor for acceleration and deceleration, instead of the $\tfrac{1}{4}$ factor utilized in the above example for both cases. Such a different provision of the weighting factor is of course of possible use both for the determination of the beginning of dwell and for the determination of ignition timing. In the limiting case, this weighting factor can of course also take on the value 1.

Figure 3:
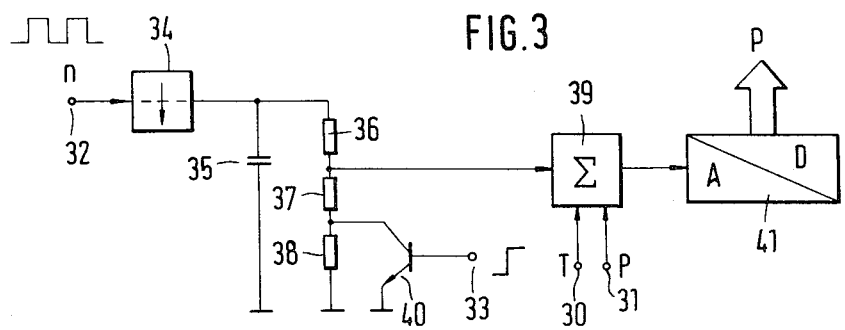
FIG. 3 is a circuit diagram of an illustrative embodiment of an apparatus for providing the input designated P in the lower righthand corner of FIG. 1.

The illustrative circuit shown on FIG. 3 shows the processing of various signals relating to engine operation usually provided by transducers for the determination of parameters to be combined into the parameter dependent count value P. The particular case of four parameters of the following kind is illustrated:

two analog voltage values are applied to the terminals 30,31 (for example, temperature T and intake duct vacuum p);

a rectangular signal frequence is applied to the terminal 32 (e.g., lead signal n); and the switching signal is applied to the terminal 33 (e.g, pressure switch or temperature switch).

The speed-dependent sequence n triggers a monostable flipflop 34, the output signals of which are supplied to a terminal of a capacitor 35 of which the other terminal is grounded. The capacitor 35 is charged by the output signals of the monostable flipflop 34 and is discharged by a parallel circuit branch composed of three resistors 36,37, and 38. A tap of the voltage divider 36-38 thus provided accordingly supplies a speed-dependent analog voltage, and this voltage is furnished to a summing amplifier 39. The switching path of a transistor 40 is connected in parallel to one of the component resistors 38 of the voltage divider 36-38 and the base of this transistor is connected to the terminal 33. If a signal dependent upon a parameter is applied to the terminal 33, the transistor 40 is turned on and the resistance 38 is bridged essentially by a short circuit. The voltage supplied to the summing amplifier 39 is thereby subjected to a downward jump in value. If the parameter value supplied to the terminal 33 is a regulating magnitude, e.g., the switching of a lambda probe for measuring the exhaust gas composition, the signal of an engine-knock sensor or a torque-dependent signal, a simple kind of regulation to avoid unfavorable types of operation can be obtained in this manner. If, on the other hand, the signal supplied to the terminal 33 is merely a correction parameter as, for example, the switching of a temperature-sensitive switch or a pressure switch, then jumps from one control characteristic to another can be obtained. All of the analog signals applied to the summing amplifier are added together and furnished to an analog-digital converter 41, at the output of which the necessary parameter-dependent count value is made available for the multiplying stage 21.

By additional circuitry utilizing diode networks, all sorts of timing shift characteristics, for example, characteristics having a sharp knee or a point of inflection can be obtained.

During the process of shifting gears, it is advantageous to shift the ignition timing in the "retard" direction. This can be performed by supplying the signal of a gear shoft switch to the terminal 33 to the transistor 40 or to a transistor connected in the appropriate sense in such a manner that the timing shift will take place in the retardation direction. In the illustrated case, this occurs with a jump shift in response to an additional influencing magnitude, e.g., T or p. If a slower function, for example, an e-function, corresponding function generator must be interposed, in which case the transistor 40 no longer operates as a switching transistor but as a continuously controllable resistance.

In the illustrative circuit of FIG. 4, there is shown the processing of the speed parameter obtained from the speed-dependent count value intermediately stored in the buffer 13, which of course is proportional to the reciprocal of the speed n, having large values for small speeds.

A complementing stage 50 for forming the complement $Z=b-a/n$ of the content $a/n$ of the buffer storage unit 13 is provided (b and a are arbitrary constants). Its output is supplied to a digital-analog converter 21. The output voltage is supplied the summing amplifier 39 and correspondingly processed. In this manner for low speeds, the output voltage zero is obtained and with increasing speed a hyperbolically rising output voltage obtained to produce by this function a shift of ignition timing increasing quickly from a threshold low speed to reach a relatively steady value. Broken line 52 signifies that the components 13 to 51 can advantageously be integrated with the circuit of FIG. 1 in an IC while the analog side is provided as external circuitry for this IC.

In principle, it is, of course, also possible to feed the output count value of the complementing stage 50 into a digital adder along with the parameter dependent count value P formed by the remaining parameters and to feed the sum output of the adder to the multiplier stage 21. From a circuit point of view, so doing would provide a simplification, but in such a case the advantage of superimposed external characteristic selection would be sacrificed.

In the circuit shown in FIG. 5, a capacitor 60 is charged by a current source 61. The switching path of a transistor 62 is connected in parallel to the capacitor 60 and the base of the transistor is connected to a transducer 63 which supplies a regulating parameter. The common connection of the transistor 62 and the capacitor 60 is connected through a resistor 64 to the summing amplifier 39. If the transducer 63 is, for example, is an engine knock sensor, the transistor 62 is normally blocked and the capacitor 60 charges up as a result of the current supplied to it. In consequence, the ignition timing changes steadily in the direction of the spark advance. Upon activation of the engine knock sensor 63, the capacitor 60 is quickly discharged and this continues until the knock signal goes off and remains off (i.e., the ignition timing is shifted sufficiently far in the retard direction). Then the capacitor is again charged until the knock sensor operates. In this manner a regulation close to the knock boundary of the engine is produced.

For preparation of the transducer signals, any desired combination of the possibilities illustrated in FIGS. 4 and 5 can be devised and carried out.

The circuit shown in FIG. 6 illustrates the generation of any desired ignition shift characteristic or field characteristics by use of a fixed value storage unit of the kind usually known as a ready-only memory (ROM). The output count value of the ROM is added in the adding stage 71 to the parameter dependent count value P, and the sum is supplied to the multiplier stage 21. The rest of the circuit corresponds to the illustrative embodiment shown in FIG. 1, in which connection it should be noted that the component that relate to the acceleration-dependent shift can be left out in a simplified form of the circuit, in which speed-dependent count values are used to select addresses in the ROM 70 at which the stored "words" represent the ignition shift characteristic that is still to be corrected in dependent upon the parameter dependent count value P.

If fields of ignition-shift characteristics are to be generated dependent upon several parameters, additional parameters can be supplied to the input of the ROM through a multiplex device and the output can then be supplied to the adder 71 through a demultiplexing device.

Although the invention has been described with reference to particular illustrative embodiments, it will be understood that further variations and modifications thereof are possible within the inventive concept.

We claim:

1. An ignition timing system for an internal combustion engine having an ignition coil of which the primary circuit contains an electrically controllable interrupter switch for energizing the primary circuit during the dwell time of the switch and setting off a spark in the secondary circuit of the coil when the switch opens at the end of the dwell time, said timing system comprising:

means (14) for producing pulses at a constant frequency;

first counting means (11) connected for counting pulses of said constant frequency pulse producing means and having count starting means (10) connected in circuit therewith and count result storage means (13) connected for provision in said count result storage means by said first counting means of a count value ($Z_n$) representative of engine speed;

means for producing a parameter-dependent count value (P) representative of the substantially current condition of at least one engine operation parameter;

first multiplier means (21) for multiplying said parameter-dependent count value by a speed-dependent count value obtained from said engine speed count value and thereby producing a product count value, and comparator means (25) responsive to a count output of said first counting means (11) and to the count value produced by said multiplier means (21) for providing an ignition timing signal to said interrupter switch when the count output of said first counting means (11) reaches or exceeds said count value produced by said first multiplier means (21).

2. An ignition timing system as defined in claim 1, in which said count starting means (10) is responsive to the transit of a reference mark on a rotary member of said engine and is connected for causing the transfer of a count output of said first counting means (11) into said count result storage means (13) and for resetting said first counting means to its starting condition.

3. An ignition timing system as defined in claim 2, in which the output of said first multiplier means (21) is connected to buffer storage means (24) and said buffer storage means is connected to said comparator means for supplying thereto the count value produced by said multiplier means (21) in its most recent operation cycle.

4. An ignition timing system as defined in claim 1, in which means are interposed between said count result storage means (13) and said multiplier means (21) for providing an acceleration correction of said engine-speed representative count value, by subtracting from said speed-representative count value the product formed by a second multiplier means (22) by multiplying difference between successive values of said speed-representative count value and a constant multiplier factor (K).

5. An ignition timing system as defined in claim 4, in which said difference is the last previous value of said engine-speed-representative count value less the most recent value of said engine-speed-representative count vaue ($Z_{n-1}$-$Z_n$).

6. An ignition timing system as defined in claim 5 in which means are provided for multiplying said parameter-dependent count value (P) by a second speed-dependent value obtained from said engine speed count value, but smaller than the latter, and thereby producing a second product count value for causing said comparator means (25) to provide a dwell period starting signal to said interruptor switch, said means for producing said second product count value including means for applying an acceleration correction to said second speed-representative count value by subtraction therefrom of the product of a constant multiplier factor and the difference obtained by subtracting the most recent value of said second speed-dependent count value from the last previous value thereof.

7. An ignition timing system as defined in claim 5 or claim 6, in which means are provided for disabling the means for applying acceleration correction to said speed-representative count value when the most recent value of said speed-representative count value is less than the last preceding value thereof.

8. An ignition timing system as defined in claim 5 or claim 6, in which different constant factors (K) are utilized for multiplying said difference between successive values of said speed-representative count value, according to whether said difference is positive or negative.

9. An ignition timing system as defined in claim 5 or claim 6, in which said means for applying an acceleration correction include an additional count storage means (17) for storing the value of said speed-representative count value through at least the period of the next cycle of said first counting means to make available the count result of said first counting means (11) for the cycle previous to the last completed cycle thereof, also subtracting means for determining the amount of which the most recent value of said speed-representative count value differs from said stored last previous value of said speed-representative count value and means for applying said difference to said second multiplier stage (22) and for providing the output of said second multiplier stage to the same subtraction means (15) for subtracting the count value provided by said output from said most recent value of said speed-representative count value, said timing system also containing sequence timing control means timed by the output of said first counting means (11) and having outputs for sequencing the loading of said additional count value storage means (17), the selection of the inputs thereto, the transfer of the outputs of said subtracting means (15) and the transfer of the product count value formed by said first multiplier (21) to said comparator means (25).

10. An ignition timing system as defined in claim 1, in which read-only memory means (70) are provided responsive to engine speed-dependent count value signals for providing outputs to said multiplier stage (21) for multiplication by said parameter-dependent count value (P), in order that a desired ignition timing shift characteristic may be provided to the ignition timing system.

11. An ignition timing system as defined in claim 10, in which an addition stage (71) is interposed between the outputs of said read-only memory means (70) for adding to said outputs other parameter-dependent count values (P).

12. An ignition timing system as defined in claim 1, in which said means for producing a parameter-dependent count value (P) includes an analog-to-digital converter (41) having its output connected to an input of said digital multiplier means (21).

13. An ignition timing system as defined in claim 12, in which an average value producing means (34-38) is interposed ahead of the input of said analog-to-digital converter (41) for averaging a sequence of parameter-dependent signals which is representative of an engine-operation condition.

14. An ignition timing system as defined in claim 13, in which said average value producing means comprises a monostable flipflop (34), a capacitor (35) connected to be charged by the output of said monostable flipflop and a resistive discharge circuit path (36-38) for said capacitor, whereby an analog average voltage is provided in response to repetitive operation of said flipflop at a rate representative of an engine-operation condition.

15. An ignition timing system as defined in claim 14, in which said resistive discharge circuit path of said capacitor (35) is bridged at least in part by the switching path of a controllable semiconductor switch (40) connected for response to a signal representative of the state of another engine operation parameter.

16. An ignition timing system as defined in any one of claims 12–15, in which means (50) are provided for complementing the speed-dependent count values obtained from said first counter (11) and for supplying a complement-representative output to a digital-to-analog converter for providing a speed-dependent analog value for contributing to the output of said means for producing a parameter-dependent value (P).

17. An ignition timing system as defined in claim 1, in which said means for producing a parameter-dependent count value (P) includes an electric storage device (60), a current source (61) for supplying current to said electric storage device (60) and means including an electrically controllable switch for discharging said electric storage device discontinuously in response to a regulating parameter signal provided by said engine.

18. An ignition timing system as defined in claim 1, in which said means for producing a parameter-dependent count value (P) includes a summing amplifier (39) having inputs connected for receiving signals having analog parameter-dependent values and an analog-to-digital converter (41) for converting the output of said summing amplifier into a digital signal constituting said parameter-dependent count value (P).

* * * * *